(12) United States Patent
Jang et al.

(10) Patent No.: US 7,485,069 B2
(45) Date of Patent: Feb. 3, 2009

(54) POWER TRAIN OF AUTOMATIC TRANSMISSION

(75) Inventors: Wookjin Jang, Yongin (KR); Kunsoo Jung, Ansan (KR)

(73) Assignee: Hyundai Motor Company, Seoul (KR)

( * ) Notice: Subject to any disclaimer, the term of this patent is extended or adjusted under 35 U.S.C. 154(b) by 347 days.

(21) Appl. No.: 11/590,636

(22) Filed: Oct. 31, 2006

(65) Prior Publication Data

US 2008/0020889 A1    Jan. 24, 2008

(30) Foreign Application Priority Data

Jul. 20, 2006    (KR) .............. 10-2006-0068024

(51) Int. Cl.
*F16H 3/44*    (2006.01)
(52) U.S. Cl. .......... 475/284; 475/330; 475/275
(58) Field of Classification Search ........ 475/275, 475/277, 278, 284, 330, 311, 313, 323, 325
See application file for complete search history.

(56) References Cited

U.S. PATENT DOCUMENTS

| | | | | |
|---|---|---|---|---|
| 5,106,352 | A * | 4/1992 | Lepelletier | 475/280 |
| 6,910,985 | B2 * | 6/2005 | Ishimaru et al. | 475/275 |
| 7,014,590 | B2 * | 3/2006 | Stevenson | 475/284 |
| 7,076,355 | B2 * | 7/2006 | Ota et al. | 701/51 |
| 7,300,383 | B2 * | 11/2007 | Nozaki et al. | 477/131 |
| 7,344,470 | B2 * | 3/2008 | Adolf et al. | 475/269 |
| 7,354,376 | B2 * | 4/2008 | Rihn et al. | 475/284 |
| 7,429,229 | B2 * | 9/2008 | Raghavan | 475/275 |
| 7,438,662 | B2 * | 10/2008 | Chang et al. | 475/276 |
| 2002/0142880 | A1 * | 10/2002 | Hayabuchi et al. | 475/275 |
| 2004/0014553 | A1 * | 1/2004 | Ishimaru | 475/275 |
| 2005/0026739 | A1 * | 2/2005 | Ishimaru | 475/277 |
| 2005/0090355 | A1 * | 4/2005 | Ota et al. | 475/123 |
| 2005/0170928 | A1 * | 8/2005 | Taguchi et al. | 475/284 |
| 2006/0025275 | A1 * | 2/2006 | Shim et al. | 475/276 |

FOREIGN PATENT DOCUMENTS

KR    1020030047828 A    6/2003

* cited by examiner

*Primary Examiner*—Charles A Marmor
*Assistant Examiner*—Justin Holmes
(74) *Attorney, Agent, or Firm*—Morgan, Lewis & Bockius LLP

(57) ABSTRACT

A power train of an automatic transmission includes a Ravigneaux planetary gear set having a Ravigneaux ring gear, which always acts as an output member; a Ravigneaux planet carrier; and first and second Ravigneaux sun gears. The power train further includes a simple planetary gear set including an input member connected to an input shaft, a member fixedly connected to the Ravigneaux planet carrier, and a member variably connected to the Ravigneaux ring gear. The power train further includes a first brake variably stopping the Ravigneaux planet carrier, a second brake variably stopping the first Ravigneaux sun gear, a first clutch rotating the simple planetary gear set, a second clutch variably connecting the second Ravigneaux sun gear to the input shaft, a third clutch variably connecting the first Ravigneaux sun gear to the input shaft, and a fourth clutch variably connecting the variably connected member to the Ravigneaux ring gear.

23 Claims, 9 Drawing Sheets

| GEAR STEP | B1 | B2 | C1 | C2 | C3 | C4 | SPEED RATIO | STEP RATIO |
|---|---|---|---|---|---|---|---|---|
| D1 | O |   |   |   | O |   | 3.333 |   |
| D2 |   | O |   | O |   |   | 2.500 | 1.333 |
| D3 | O |   |   |   |   | O | 1.778 | 1.406 |
| D4 |   | O | O |   |   | O | 1.429 | 1.244 |
| D5 |   |   | O |   |   | O | 1.000 | 1.429 |
| D6 |   | O |   |   |   | O | 0.667 | 1.500 |
| R | O |   |   | O |   |   | -2.500 |   |

| | 1 | 2 | 3 | 4 | 5 | 6 | R1 |
|---|---|---|---|---|---|---|---|
| □B1 | 0.000 | 0.571 | 0.000 | 1.000 | 1.000 | 2.143 | 0.000 |
| ▨B2 | 1.000 | 0.000 | 1.875 | 0.000 | 1.000 | 0.000 | 1.333 |
| □C1 | 1.000 | 0.429 | 1.000 | 0.000 | 0.000 | 1.143 | 1.000 |
| □C2 | 1.750 | 0.000 | 2.406 | 0.750 | 0.000 | 2.750 | 0.000 |
| ■C3 | 0.000 | 1.000 | 0.875 | 1.000 | 0.000 | 1.000 | 2.333 |
| □C4 | 0.263 | 0.413 | 0.000 | 0.300 | 0.000 | 0.000 | 0.963 |

FIG. 6B

|     | 1     | 2     | 3     | 4     | 5     | 6     | R1    |
|-----|-------|-------|-------|-------|-------|-------|-------|
| □B1 | 0.000 | 0.571 | 0.000 | 1.000 | 1.000 | 2.143 | 0.000 |
| ■B2 | 1.000 | 0.000 | 1.875 | 0.000 | 1.000 | 0.000 | 1.333 |
| □C1 | 0.563 | 0.241 | 0.563 | 0.000 | 0.000 | 0.643 | 0.563 |
| □C2 | 1.750 | 0.000 | 2.406 | 0.750 | 0.000 | 2.750 | 0.000 |
| ■C3 | 0.000 | 1.000 | 0.875 | 1.000 | 0.000 | 1.000 | 2.333 |
| □C4 | 0.263 | 0.413 | 0.000 | 0.300 | 0.000 | 0.000 | 0.963 |

FIG. 6C

| | 1 | 2 | 3 | 4 | 5 | 6 | R1 |
|---|---|---|---|---|---|---|---|
| B1 | 0.000 | 0.571 | 0.000 | 1.000 | 1.000 | 2.143 | 0.000 |
| B2 | 1.000 | 0.000 | 1.875 | 0.000 | 1.000 | 0.000 | 1.333 |
| C1 | 0.438 | 0.188 | 0.438 | 0.000 | 0.000 | 0.500 | 0.438 |
| C2 | 1.750 | 0.000 | 2.406 | 0.750 | 0.000 | 2.750 | 0.000 |
| C3 | 0.000 | 1.000 | 0.875 | 1.000 | 0.000 | 1.000 | 2.333 |
| C4 | 0.263 | 0.413 | 0.000 | 0.300 | 0.000 | 0.000 | 0.963 |

FIG. 7A

|      | 1.000 | 2.000 | 3.000 | 4.000 | 5.000 | 6.000 | R1    |
|------|-------|-------|-------|-------|-------|-------|-------|
| □B1  | 2.333 | 0.000 | 0.778 | 0.000 | 0.000 | 0.000 | 3.500 |
| ■B2  | 0.000 | 1.500 | 0.000 | 0.429 | 0.000 | 0.333 | 0.000 |
| □C1  | 0.000 | 0.000 | 0.000 | 1.000 | 0.438 | 0.000 | 0.000 |
| □C2  | 0.000 | 1.000 | 0.000 | 0.000 | 0.000 | 0.000 | 1.000 |
| ■C3  | 1.000 | 0.000 | 0.000 | 0.000 | 0.000 | 0.000 | 0.000 |
| □C4  | 0.000 | 0.000 | 1.778 | 0.000 | 1.000 | 1.778 | 0.000 |

|     | 1 | 2 | 3 | 4 | 5 | 6 | R1 |
|-----|-------|-------|-------|-------|-------|-------|-------|
| ☐ B1 | 2.333 | 0.000 | 0.778 | 0.000 | 0.000 | 0.000 | 3.500 |
| ■ B2 | 0.000 | 1.500 | 0.000 | 0.429 | 0.000 | 0.333 | 0.000 |
| ☐ C1 | 0.000 | 0.000 | 0.000 | 2.286 | 1.000 | 0.000 | 0.000 |
| ☐ C2 | 0.000 | 1.000 | 0.000 | 0.000 | 0.000 | 0.000 | 1.000 |
| ■ C3 | 1.000 | 0.000 | 0.000 | 0.000 | 0.000 | 0.000 | 0.000 |
| ☐ C4 | 0.000 | 0.000 | 1.778 | 0.000 | 1.000 | 1.778 | 0.000 |

POWER TRAIN OF AUTOMATIC TRANSMISSION

CROSS-REFERENCE TO RELATED APPLICATION

This application claims priority to and the benefit of Korean Patent Application No. 10-2006-0068024 filed in the Korean Intellectual Property Office on Jul. 20, 2006, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes six forward speeds and one reverse speed.

(b) Description of the Related Art

A typical shift mechanism of an automatic transmission utilizes a combination of planetary gear sets. A power train of such an automatic transmission changes rotating speed and torque received from a torque converter of the automatic transmission, and accordingly changes and transmits the torque to an output shaft.

When a transmission includes a relatively large number of shift speeds, speed ratios can be optimally designed and therefore a vehicle can have better fuel mileage and better performance than those with smaller numbers of shift speeds.

In addition, features of a power train such as durability, efficiency in power transmission, and size depend a lot on the layout of combined planetary gear sets.

A manual transmission with many speeds causes the inconvenience of excessively frequent shifting by the driver. Therefore, a transmission with more shift-speeds lends itself better to automatic transmissions.

Korean Patent No. 0504520 discloses a power train of an automatic transmission with six forward speeds and one reverse speed. The transmission includes three planetary gear sets, two clutches, and three brakes. However, since three planetary gear sets are used, the power train is heavy.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a power train of an automatic transmission with six forward speeds and one reverse speed. The transmission includes two planetary gear sets.

Exemplary power trains of an automatic transmission according to embodiments of the present invention may include: a Ravigneaux planetary gear set having a Ravigneaux ring gear, a Ravigneaux planet carrier, and first and second Ravigneaux sun gears, wherein the Ravigneaux ring gear always acts as an output member; a simple planetary gear set including an input member that is fixedly connected to an input shaft, a fixedly connected member that is fixedly connected to the Ravigneaux planet carrier, and a variably connected member that is variably connected to the Ravigneaux ring gear; a first brake for variably stopping the Ravigneaux planet carrier; a second brake for variably stopping the first Ravigneaux sun gear; a first clutch for rotating the simple planetary gear set; a second clutch for variably connecting the second Ravigneaux sun gear to the input shaft; a third clutch for variably connecting the first Ravigneaux sun gear to the input shaft; and a fourth clutch for variably connecting the variably connected member to the Ravigneaux ring gear.

The simple planetary gear set may be a double pinion planetary gear set having a first sun gear, a first planet carrier, and a first ring gear, wherein the first sun gear is the fixedly connected member fixedly connected to the Ravigneaux planet carrier, the first planet carrier is the input member, and the first ring gear is operated as the variably connected member.

The first clutch may variably connect the first sun gear to the input shaft. Alternatively, the first clutch may variably connect the first sun gear to the first ring gear. Alternatively, the first clutch may variably connect the first ring gear to the input shaft.

In addition, according to embodiments of the present invention, the first brake and the third clutch are operated in a first forward speed, the second brake and the second clutch are operated in a second forward speed, the first brake and the fourth clutch are operated in a third forward speed, the second brake and the first clutch are operated in a fourth forward speed, the first clutch and the fourth clutch are operated in a fifth forward speed, the second brake and the fourth clutch are operated in a sixth forward speed, and the first brake and the second clutch are operated in a first reverse speed.

A power train of an automatic transmission according to a first embodiment of the present invention may include: a first planetary gear set having a first sun gear, a first ring gear, and a first planet carrier; a second planetary gear set having a Ravigneaux ring gear, a Ravigneaux planet carrier, and first and second Ravigneaux sun gears; an input shaft; an output gear; and a transmission case; wherein the first sun gear is fixedly connected to the Ravigneaux planet carrier, the first planet carrier always acts as an input member by being fixedly connected to the input shaft, the Ravigneaux ring gear always acts as an output member by being fixedly connected to the output gear, the first sun gear is variably connected to the input shaft via a first clutch, the second Ravigneaux sun gear is variably connected to the input shaft via a second clutch, the first Ravigneaux sun gear is variably connected to the input shaft via a third clutch, the Ravigneaux ring gear is variably connected to the first ring gear via a fourth clutch, the Ravigneaux planet carrier is variably connected to the transmission case via a first brake and is subjected to a stopping operation of the first brake, and the first Ravigneaux sun gear is variably connected to the transmission case via a second brake and is subjected to a stopping operation of the second brake.

The output gear may be disposed opposite the input shaft with reference to the first planetary gear set. The first and second brakes may be disposed near the output gear.

The first clutch may be disposed opposite the second planetary gear set with reference to the first planetary gear set, the second and fourth clutches may be disposed between the first planetary gear set and the second planetary gear set, and the third clutch may be disposed opposite the first planetary gear set with reference to the second planetary gear set.

The first, second, and third clutches may be disposed near the input shaft, and the fourth clutch is disposed near the output gear.

A power train of an automatic transmission according to a second embodiment of the present invention may include: a first planetary gear set having a first sun gear, a first ring gear, and a first planet carrier; a second planetary gear set having a Ravigneaux ring gear, a Ravigneaux planet carrier, and first and second Ravigneaux sun gears; an input shaft; an output gear; and a transmission case; wherein the first sun gear is fixedly connected to the Ravigneaux planet carrier, the first planet carrier always acts as an input member by being fixedly connected to the input shaft, the Ravigneaux ring gear always acts as an output member by being fixedly connected to the output gear, the first ring gear is variably connected to the Ravigneaux planet carrier via a first clutch, the second Ravigneaux sun gear is variably connected to the input shaft via a second clutch, the first Ravigneaux sun gear is variably connected to the input shaft via a third clutch, the first ring gear is variably connected to the Ravigneaux ring gear via a fourth clutch, the Ravigneaux planet carrier is variably connected to the transmission case via a first brake and is subjected to a stopping operation of the first brake, and the first Ravigneaux sun gear is variably connected to the transmission case via a second brake and is subjected to a stopping operation of the second brake.

The output gear may be disposed opposite the input shaft with reference to the first planetary gear set. The first and second brakes may be disposed near the output gear. The first, second, and fourth clutches may be disposed between the first planetary gear set and the second planetary gear set, and the third clutch may be disposed opposite the first planetary gear set with reference to the second planetary gear set.

A power train of an automatic transmission according to a third embodiment of the present invention may include: a first planetary gear set having a first sun gear, a first ring gear, and a first planet carrier; a second planetary gear set having a Ravigneaux ring gear, a Ravigneaux planet carrier, and first and second Ravigneaux Sun gears; an input shaft; an output gear; and a transmission case; wherein the first sun gear is fixedly connected to the Ravigneaux planet carrier, the first planet carrier always acts as an input member by being fixedly connected to the input shaft, the Ravigneaux ring gear always acts as an output member by being fixedly connected to the output gear, the first planet carrier is variably connected to the first ring gear via a first clutch, the second Ravigneaux sun gear is variably connected to the input shaft via a second clutch, the first Ravigneaux sun gear is variably connected to the input shaft via a third clutch, the first ring gear is variably connected to the Ravigneaux ring gear via a fourth clutch, the Ravigneaux planet carrier is variably connected to the transmission case via a first brake and is subjected to a stopping operation of the first brake, and the first Ravigneaux sun gear is variably connected to the transmission case via a second brake and is subjected to a stopping operation of the second brake.

The output gear may be disposed opposite the input shaft with reference to the first planetary gear set. The first and second brakes may be disposed near the output gear.

The first clutch may be disposed opposite the second planetary gear set with reference to the first planetary gear set, the second and fourth clutches may be disposed between the first planetary gear set and the second planetary gear set, and the third clutch may be disposed opposite the first planetary gear set with reference to the second planetary gear set. The second and third clutches may be disposed near the input shaft, and the first and fourth clutches may be disposed near the output gear.

DETAILED DESCRIPTION OF THE PREFERRED EMBODIMENTS

Exemplary embodiments of the present invention will hereinafter be described in detail with reference to the accompanying drawings.

Figure 1:
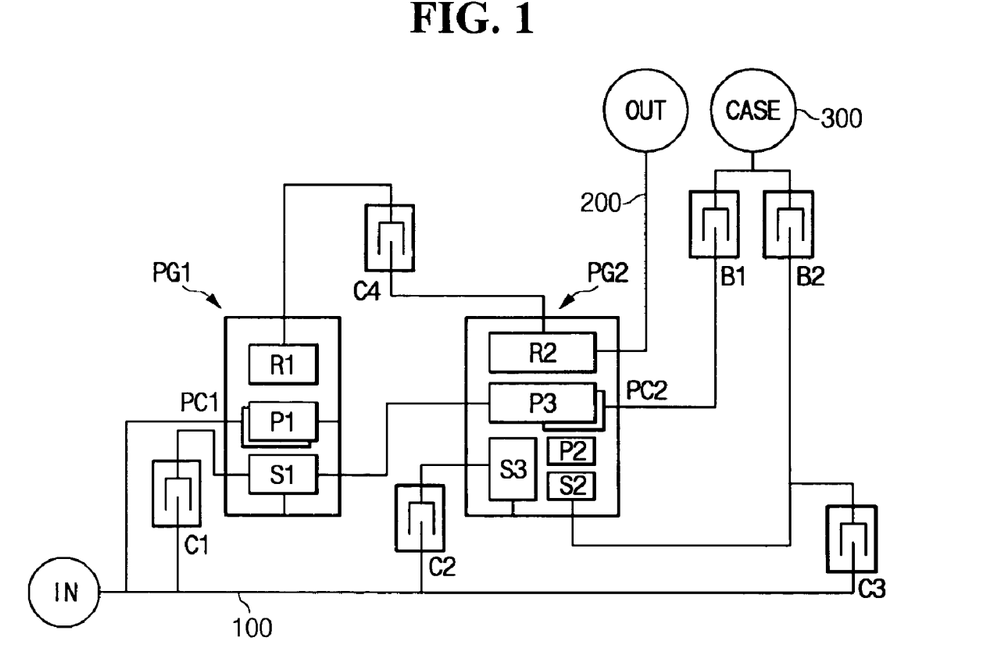
FIG. 1 is a schematic diagram of a power train of an automatic transmission according to a first exemplary embodiment of the present invention.
Figure 2:
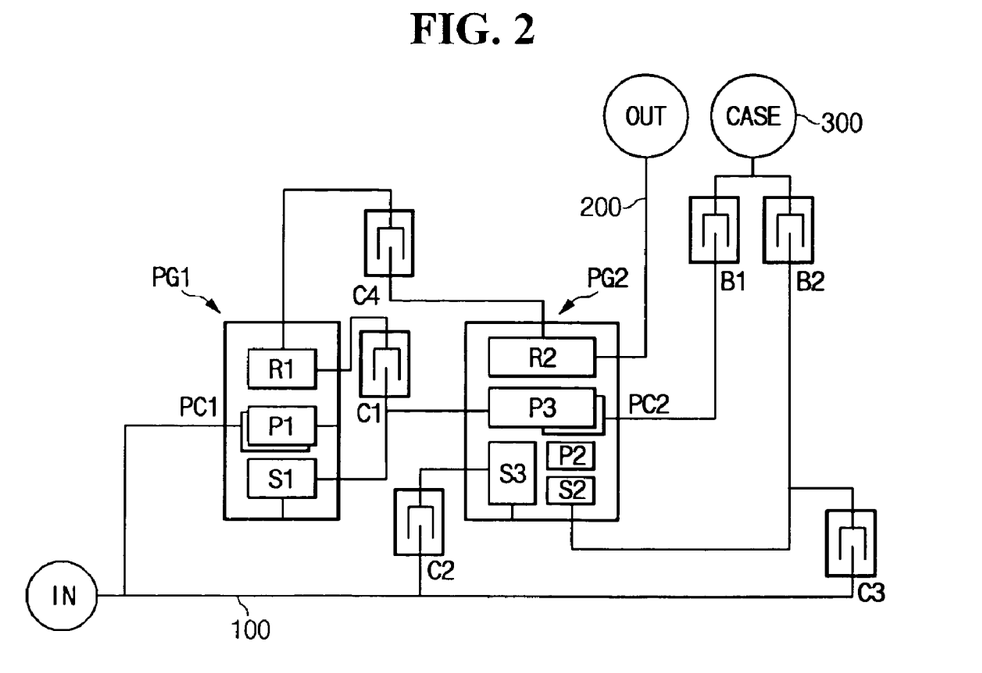
FIG. 2 is a schematic diagram of a power train of an automatic transmission according to a second exemplary embodiment of the present invention.
Figure 3:
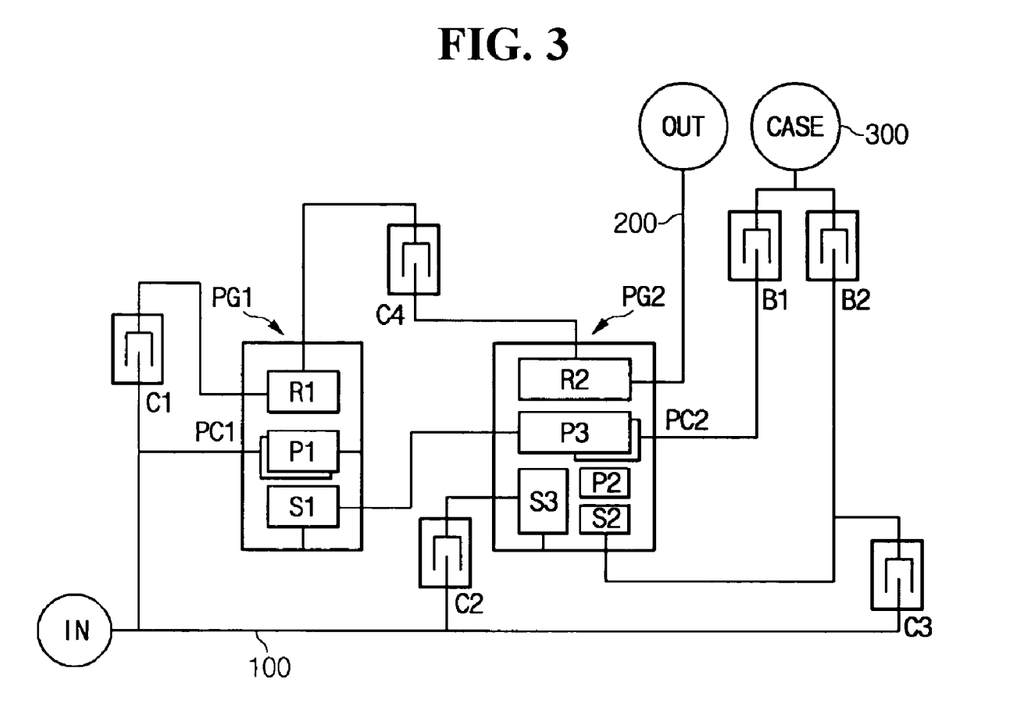
FIG. 3 is a schematic diagram of a power train of an automatic transmission according to a third exemplary embodiment of the present invention.

As shown in FIG. 1 to FIG. 3, a power train of an automatic transmission according to exemplary embodiments of the present invention includes first and second planetary gear sets PG1 and PG2.

The first planetary gear set PG1 is a double pinion planetary gear set, and includes a first sun gear S1, a first planet carrier PC1, and a first ring gear R1. A pinion gear P1, engaged with both the first ring gear R1 and the first sun gear S1, is connected to and carried by the first planet carrier PC1. The first sun gear S1 is a fixedly connected member, the first planet carrier PC1 is an input member, and the first ring gear R1 is a variably connected member.

The second planetary gear set PG2 is a Ravigneaux planetary gear set, i.e. it includes a single carrier containing two sets of planet pinions: long pinions and short pinions. Each pinion set includes three pinions, each pinion being mutually spaced angularly about a central axis, each short pinion meshing with a corresponding long pinion. It includes two sun gears, a short sun gear meshing with the three short pinions, and a long sun gear meshing with the three long pinions. It includes one ring gear, which meshes with the three long pinions. Both planet pinion sets are supported for rotation on the carrier. Each long pinion is in mesh with a short pinion, the ring gear, and the long sun gear. Each short pinion is in mesh with a long pinion and the short sun gear.

Planetary gear set PG2 includes a Ravigneaux ring gear R2, a Ravigneaux planet carrier PC2, and first and second Ravigneaux sun gears S2 and S3. A second pinion gear P2, engaged with both the first Ravigneaux sun gear S2 and the Ravigneaux ring gear R2, and a third pinion gear P3, engaged with both the second Ravigneaux sun gear S3 and the Ravigneaux ring gear R2, are connected to and carried by the Ravigneaux planet carrier PC2. The Ravigneaux ring gear R2 always acts as an output member.

The power train further includes an input shaft 100 for receiving torque from an engine (not shown), an output gear 200 for outputting torque from the power train, a transmission case 300, a first brake B1 for variably stopping the Ravigneaux planet carrier PC2, a second brake B2 for variably stopping the first Ravigneaux sun gear S2, a first clutch C1 for integrally rotating the first planetary gear set PG1, a second clutch C2 for variably connecting the second Ravigneaux sun gear S3 to the input shaft 100, a third clutch C3 for variably connecting the first Ravigneaux sun gear S2 to the input shaft 100, and a fourth clutch C4 for variably connecting the first ring gear R1 to the Ravigneaux ring gear R2.

In some embodiments, the first clutch C1 integrally rotates the first planetary gear set PG1. Various dispositions of such first clutch C1 may be possible.

In a first exemplary embodiment of the present invention, as shown in FIG. 1, the first clutch C1 variably connects the first sun gear S1 to the input shaft 100. The first sun gear S1 is fixedly connected to the Ravigneaux planet carrier PC2. The first planet carrier PC1 always acts as the input member by being fixedly connected to the input shaft 100. The Ravigneaux ring gear R2 always acts as the output member by being fixedly connected to the output gear 200. The first sun gear S1 is variably connected to the input shaft 100 via the first clutch C1. The second Ravigneaux sun gear S3 is variably connected to the input shaft 100 via the second clutch C2. The first Ravigneaux sun gear S2 is variably connected to the input shaft 100 via the third clutch C3. The Ravigneaux ring gear R2 is variably connected to the first ring gear R1 via the fourth clutch C4. The Ravigneaux planet carrier PC2 is variably connected to the transmission case 300 via the first brake B1 and is subjected to a stopping operation of the first brake B1. The first Ravigneaux sun gear S2 is variably connected to the transmission case 300 via the second brake B2 and is subjected to a stopping operation of the second brake B2.

The output gear 200 is disposed opposite the input shaft 100 with reference to the first planetary gear set PG1. The first brake B1 and the second brake B2 are disposed near the output gear 200. The first clutch C1 is disposed opposite the second planetary gear set PG2 with referenced to the first planetary gear set PG1. The second and fourth clutches C2 and C4 are disposed between the first planetary gear set PG1 and the second planetary gear set PG2. The third clutch C3 is disposed opposite the first planetary gear set PG1 with reference to the second planetary gear set PG2.

The first, second, and third clutches C1, C2, and C3 are disposed near the input shaft 100, and the fourth clutch C4 is disposed near the output gear 200.

Hereinafter, an operation of the power train of an automatic transmission according to the first exemplary embodiment of the present invention will be described.

Figure 4:
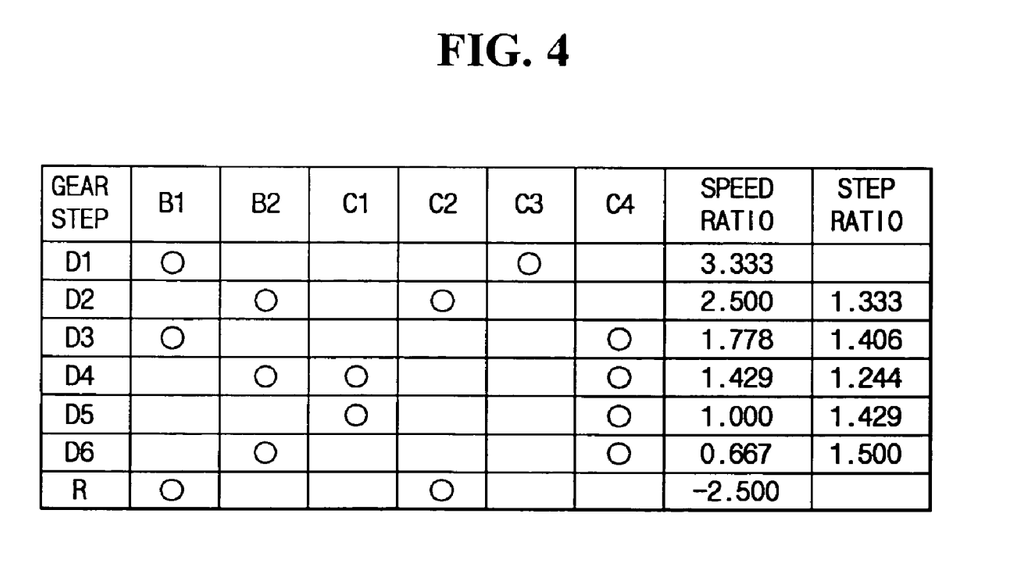
FIG. 4 is an operational chart of a power train of an automatic transmission according to exemplary embodiments of the present invention.

As shown in FIG. 4, according to the first exemplary embodiment of the present invention, the first brake B1 and the third clutch C3 are operated in a first forward speed D1, the second brake B2 and the second clutch C2 are operated in a second forward speed D2, the first brake B1 and the fourth clutch C4 are operated in a third forward speed D3, the second brake B2 and the first clutch C1 are operated in a fourth forward speed D4, the first clutch C1 and the fourth clutch C4 are operated in a fifth forward speed D5, the second brake B2 and the fourth clutch C4 are operated in a sixth forward speed D6, and the first brake B1 and the second clutch C2 are operated in a first reverse speed R.

Hereinafter, an up-shifting processes of a power train of an automatic transmission according to the first exemplary embodiment of the present invention will be described in detail.

In the shifting process from the first forward speed D1 to the second forward speed D2, the first brake B1 and the third clutch C3 are released, and the second brake B2 and the second clutch C2 are operated.

In the shifting process from the second forward speed D2 to the third forward speed D3, the second brake B2 and the second clutch C2 are released, and the first brake B1 and the fourth clutch C4 are operated.

In the shifting process from the third forward speed D3 to the fourth forward speed D4, the first brake B1 and the fourth clutch C4 are released, and the second brake B2 and the first clutch C1 are operated.

In the shifting process from the fourth forward speed D4 to the fifth forward speed D5, the second brake B2 is released, and the fourth clutch C4 is operated.

In the shifting process from the fifth forward speed D5 to the sixth forward speed D6, the first clutch C1 is released, and the second brake B2 is operated.

Down-shifting processes are reverse processes of the up-shifting processes according to the first exemplary embodiment of the present invention.

Hereinafter, skip down-shifting processes according to the first exemplary embodiment of the present invention will be described.

In the skip down-shifting process from the sixth forward speed D6 to the fourth forward speed D4, the fourth clutch C4 is released, and the first clutch C1 is operated.

In the skip down-shifting process from the fifth forward speed D5 to the third forward speed D3, the first clutch C1 is released, and the first brake B1 is operated.

In the skip down-shifting process from the fourth forward speed D4 to the second forward speed D2, the first clutch C1 is released, and the second clutch C2 is operated.

In the skip down-shifting process from the third forward speed D3 to the first forward speed D1, the fourth clutch C4 is released, and the third clutch C3 is operated.

In the skip down-shifting process from the sixth forward speed D6 to the third forward speed D3, the second brake B2 is released, and the first brake B1 is operated.

In the skip down-shifting process from the fifth forward speed D5 to the second forward speed D2, the first and fourth clutches C1 and C4 are released, and the second brake B2 and the second clutch C2 are operated.

In the skip down-shifting process from the fourth forward speed D4 to the first forward speed D1, the second brake B2 and the first clutch C1 are released, and the first brake B1 and the third clutch C3 are operated.

Skip up-shifting processes are reverse processes of the skip down-shifting processes according to the first exemplary embodiment of the present invention.

Figure 5:
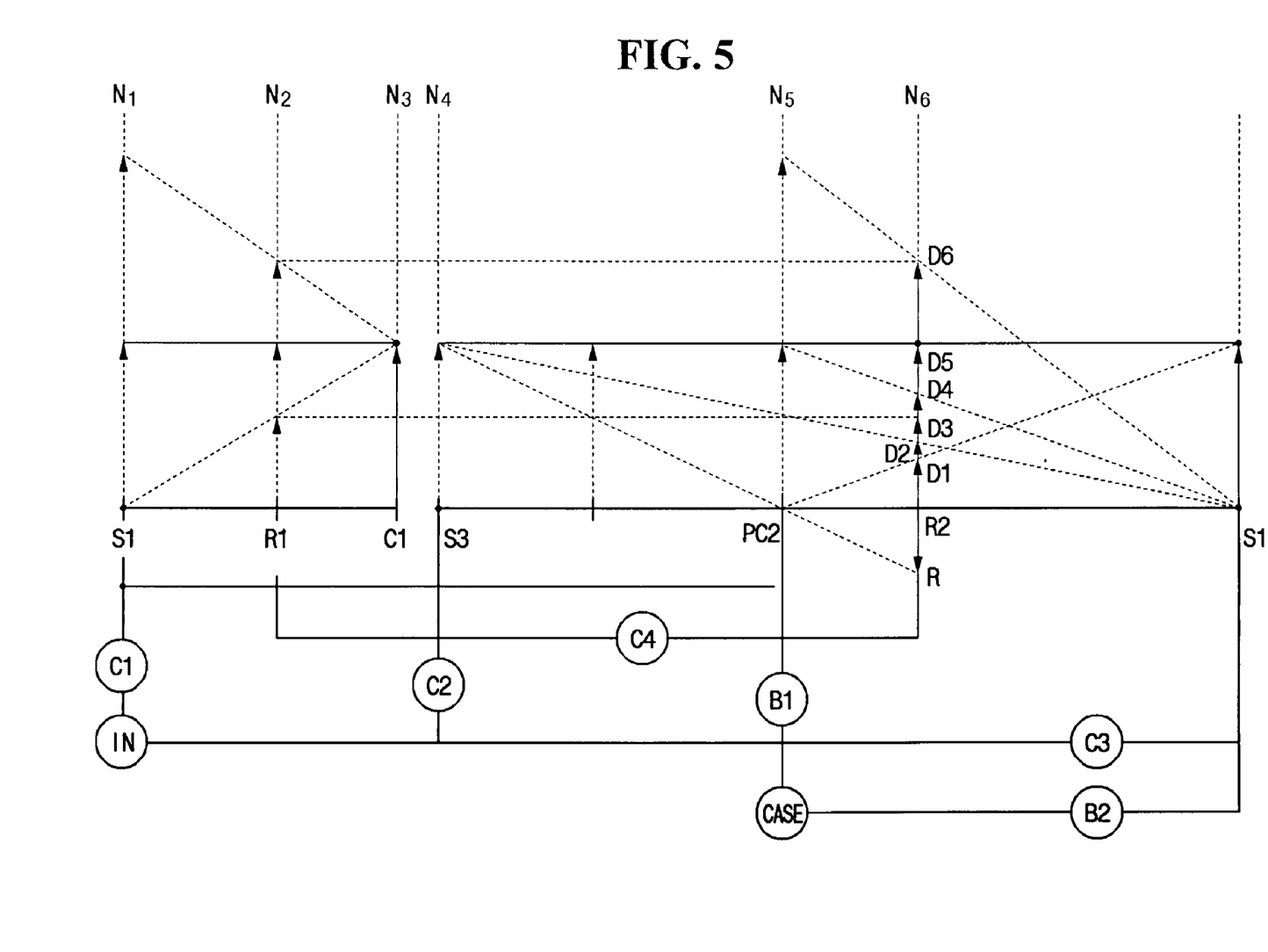
FIG. 5 is a lever diagram showing shifting processes from a first forward speed to a first reverse speed in a power train of an automatic transmission according to the first embodiment of the present invention.
Figure 6A:
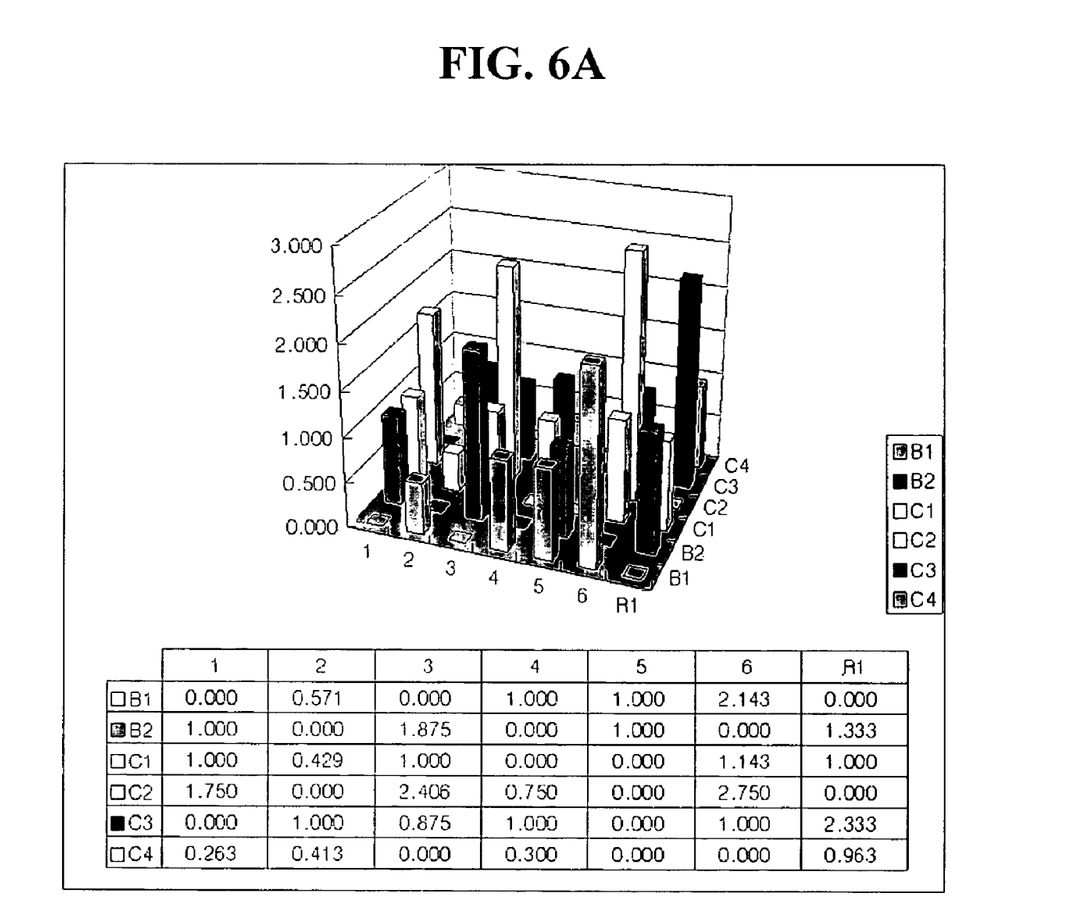
FIG. 6A to FIG. 6C are tables and graphs showing relative rotational speeds of frictional elements in the power trains according to exemplary embodiments of the present invention.
Figure 6B:
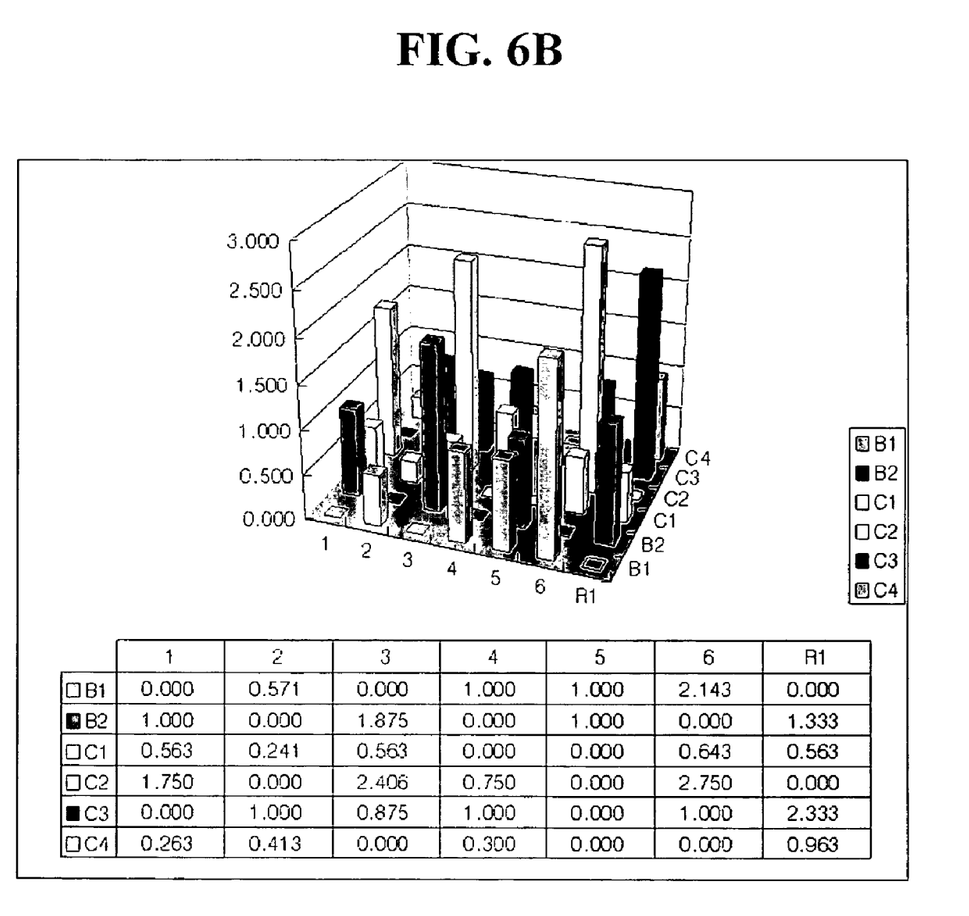
Figure 6C:
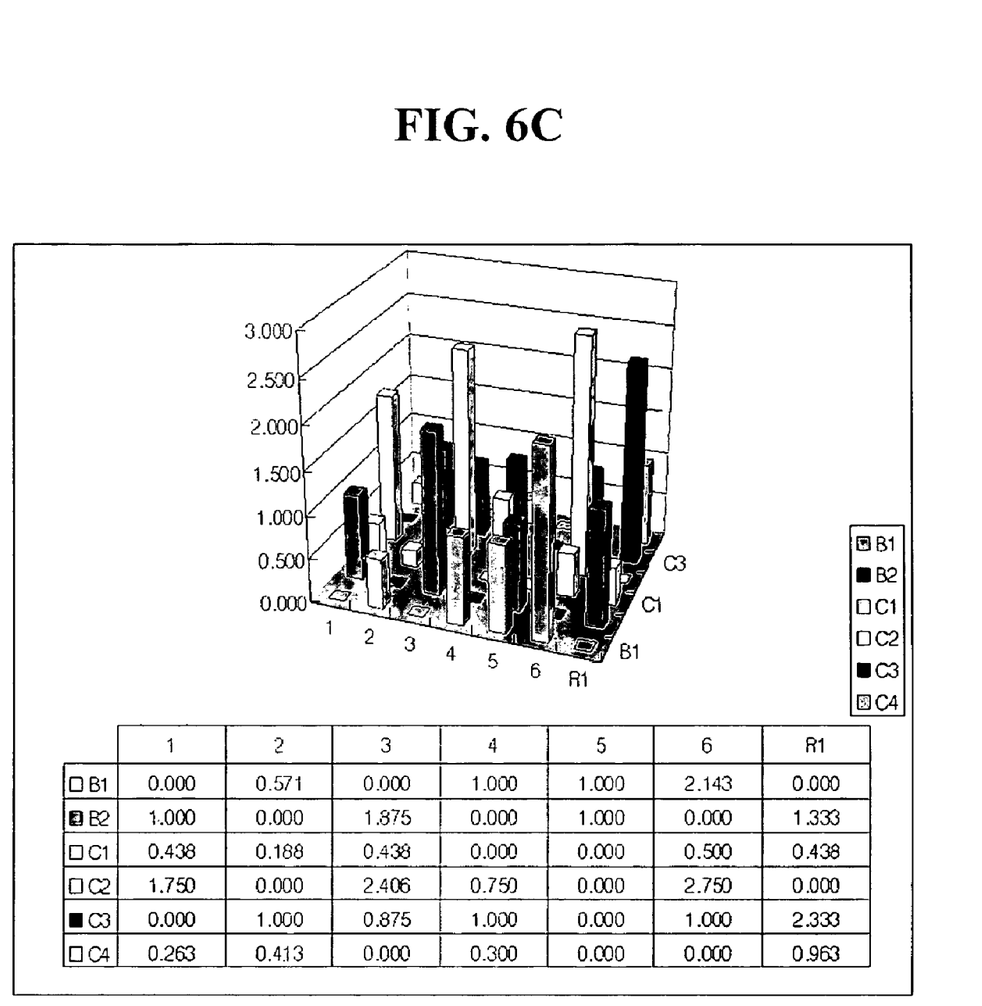
Figure 7A:
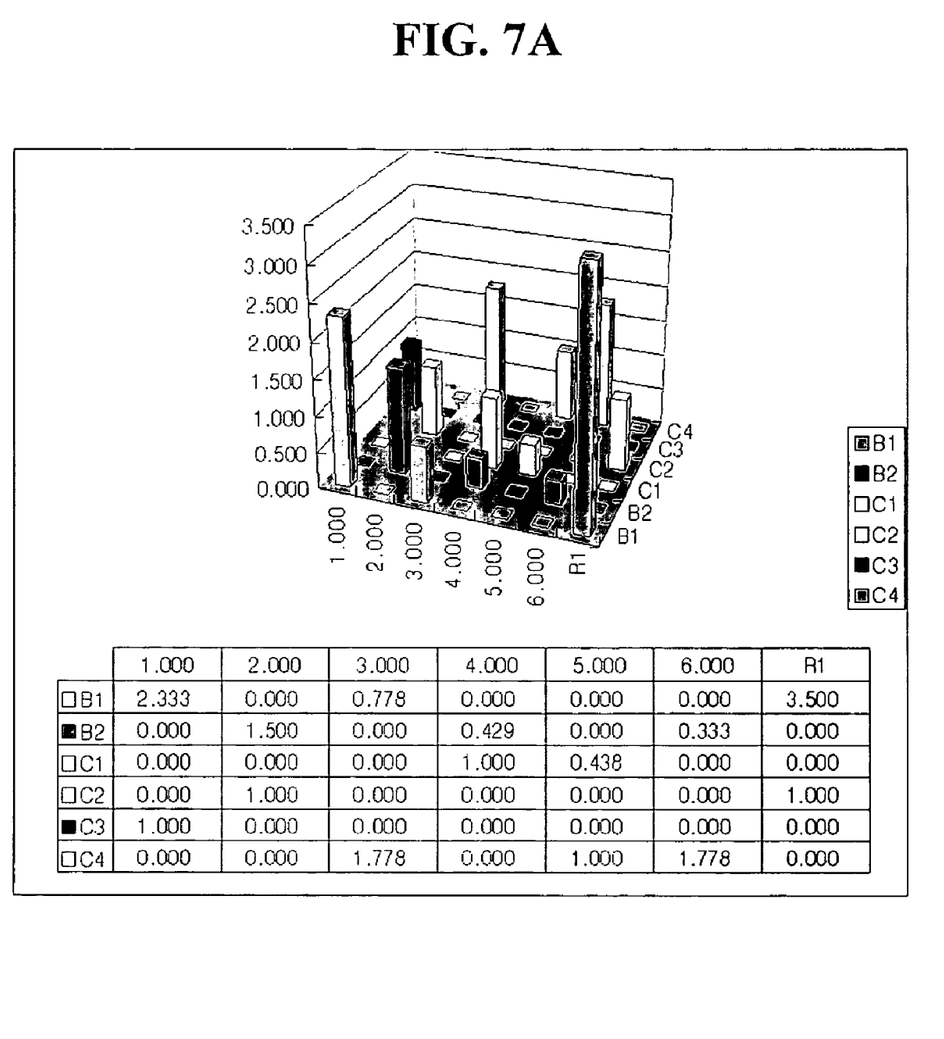
FIG. 7A to FIG. 7C are tables and graphs showing reacting torque ratios of frictional elements in the power trains according to exemplary embodiments of the present invention.
Figure 7B:
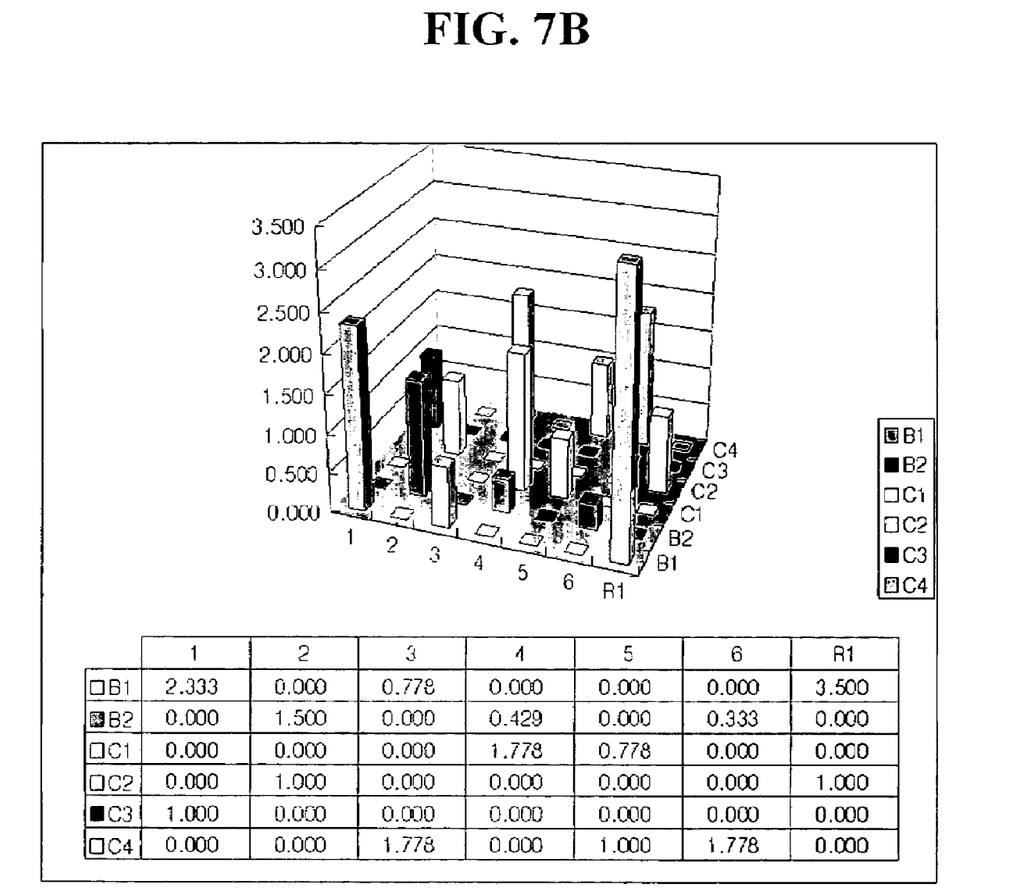
Figure 7C:
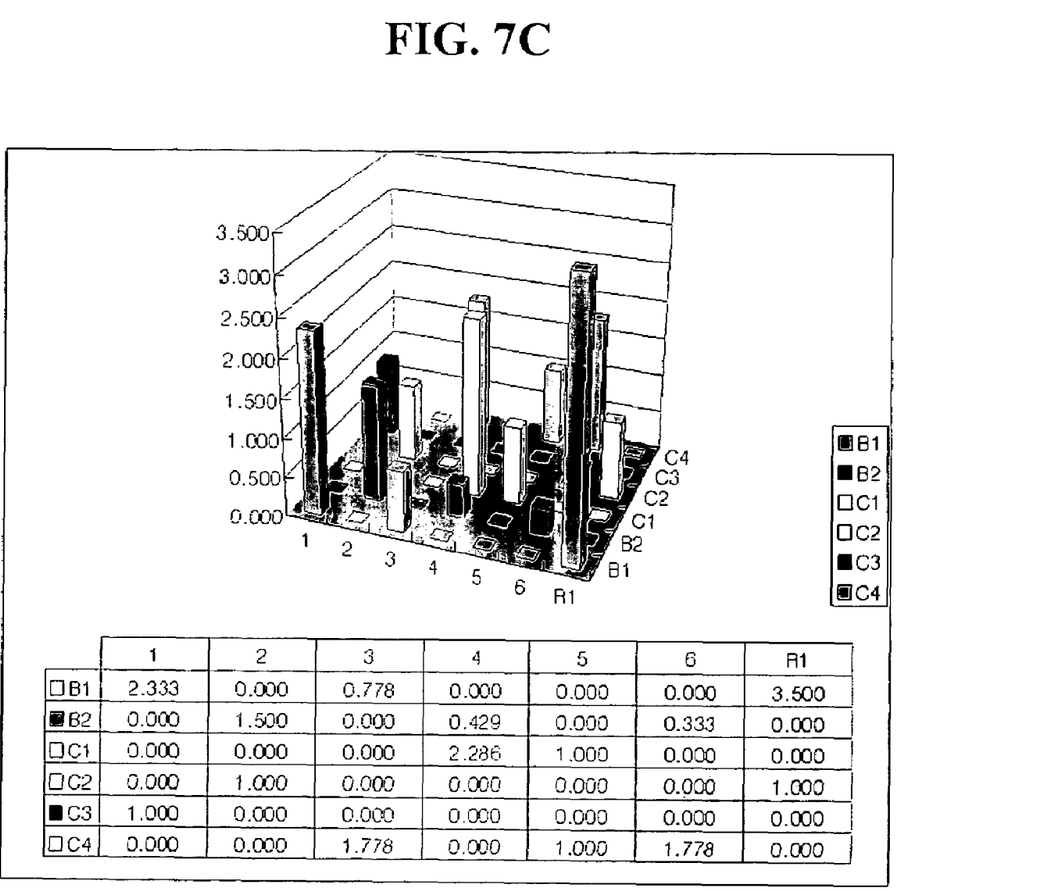

FIG. 5 is a lever diagram showing shifting processes from a first forward speed to a first reverse speed in a power train of an automatic transmission according to the first embodiment of the present invention. As shown in FIG. 5, a power train of an automatic transmission according to the first embodiment of the present invention includes one double pinion planetary gear set and one Ravigneaux planetary gear set. Therefore, operational members of the exemplary power train of an automatic transmission according to the first embodiment of the present invention are represented as seven nodes in the lever diagram.

Accordingly, the first sun gear S1 is set to a first node N1, the first ring gear R1 is set to a second node N2, the first planet carrier PC1 is set to a third node N3, the second Ravigneaux sun gear S3 is set to a fourth node N4, the Ravigneaux planet carrier PC2 is set to a fifth node N5, the Ravigneaux ring gear R2 is set to a sixth node N6, the first Ravigneaux sun gear S2 is set to a seventh node N7.

As described above, the third node N3 of the first planet carrier PC1 always acts as the input member by being fixedly connected to the input shaft 100.

The first node N1 of the first sun gear S1 is variably connected to the input shaft 100 via the first clutch C1, the fourth node N4 of the second Ravigneaux sun gear S3 is variably connected to the input shaft 100 via the second clutch C2, and the seventh node N7 of the first Ravigneaux sun gear S2 is variably connected to the input shaft 100 via the third clutch C3. Therefore, a rotational speed of the engine input through the input shaft 100 is transmitted to the first, fourth, and seventh nodes N1, N4, and N7 by operations of the first, second, and third clutches C1, C2, and C3, respectively.

In addition, the first sun gear S1 is fixedly connected to the Ravigneaux planet carrier PC2. Therefore, the first node N1 and the fifth node N5 rotate with the same rotational speed.

In addition, the Ravigneaux planet carrier PC2 is variably connected to the transmission case 300 via the first brake B1, and the first Ravigneaux sun gear S2 is variably connected to the transmission case 300 via the second brake B2. Therefore, the fifth node N5 and the seventh node N7 are variably stopped by operations of the first brake B1 and the second brake B2, respectively.

Hereinafter, formation of each speed by the power train of an automatic transmission according to the first embodiment of the present invention will be described in detail, with reference to FIG. 5.

In the first forward speed D1, the seventh node N7 rotates with the same rotational speed as the input shaft 100 since the third clutch C3 is operated. In addition, the fifth node N5 is stationary since the first brake B1 is operated. Therefore, the first forward speed D1 is achieved at the sixth node N6 that is the output member.

In the second forward speed D2, the fourth node N4 rotates with the same rotational speed of the input shaft 100 since the second clutch C2 is operated. In addition, the seventh node N7 is stationary since the second brake B2 is operated. Therefore, the second forward speed D2 is achieved at the sixth node N6 that is the Ravigneaux ring gear R2, i.e. the output member.

In the third forward speed D3, the fifth node N5 is stationary since the first brake B1 is operated. In this case, the first node N1, which is fixedly connected to the fifth node N5, is also stationary. In addition, the third node N3 rotates with the same rotational speed as the input shaft 100 since the third node N3 is fixedly connected to the input shaft 100. Therefore, the second node N2 rotates with a reduced rotational speed by an operation of the first planetary gear set PG1. In addition, the reduced rotational speed of the second node N2 is transmitted to the sixth node N6 since the fourth clutch C4 is operated. Therefore, the third forward speed D3 is achieved at the sixth node N6 that is the output member.

In the fourth forward speed D4, the first node N1 rotates with the same rotational speed as the input shaft 100 since the first clutch C1 is operated. In addition, the seventh node N7 is stationary since the second brake B2 is operated. In addition, the fifth node N5, which is fixedly connected to the first node N1, rotates with the same rotational speed as the input shaft 100. Therefore, the fourth forward speed D4 is achieved at the sixth node N6 that is the output member.

In the fifth forward speed D5, the first node N1 rotates with the same rotational speed as the input shaft 100 since the first clutch C1 is operated. In addition, the third node N3, which is fixedly connected to the input shaft 100, rotates with the same rotational speed of the input shaft 100. Therefore, the second node N2 also rotates with the same rotational speed as the input shaft 100. In addition, the sixth node N6, which is connected to the second node N2, rotates with the same rotational speed as the input shaft 100 since the fourth clutch C4 is operated. Therefore, the fifth forward speed D5 is achieved at the sixth node N6 that is the output member.

In the sixth forward speed D6, the third node N3 rotates with the same rotational speed as the input shaft 100. Therefore, the second node N2 rotates with a speed that is larger that the rotational speed of the input shaft 100 by the operation of the first planetary gear set PG1. In addition, the sixth node N6, which is connected to the second node N2 rotates with the speed of the second node N2 since the fourth clutch C4 is operated. Therefore, the sixth forward speed D6 is achieved at the sixth node N6 that is the output member. In addition, the seventh node N7 is stationary since the second brake B2 is operated.

In the first reverse speed R, the fourth node N4 rotates with the same rotational speed as the input shaft 100 since the second clutch C2 is operated. In addition, the fifth node N5 is stationary since the first brake B1 is operated. Therefore, the first reverse speed R is achieved at the sixth node N6 that is the output member.

According to a second exemplary embodiment of the present invention, as shown in FIG. 2, the first clutch C1 variably connects the first sun gear S1 to the first ring gear R1. The first sun gear S1 is fixedly connected to the Ravigneaux planet carrier PC2. The first planet carrier PC1 always acts as the input member by being fixedly connected to the input shaft 100. The Ravigneaux ring gear R2 always acts as the output member by being fixedly connected to the output gear 200. The first ring gear R1 is variably connected to the Ravigneaux planet carrier PC2 via the first clutch C1. The second Ravigneaux sun gear S3 is variably connected to the input shaft 100 via the second clutch C2. The first Ravigneaux sun gear S2 is variably connected to the input shaft 100 via the third clutch C3. The first ring gear R1 is variably connected to the Ravigneaux ring gear R2 via the fourth clutch C4. The Ravigneaux planet carrier PC2 is variably connected to the transmission case 300 via the first brake B1 and is subjected to a stopping operation of the first brake B1. The first Ravigneaux sun gear S2 is variably connected to the transmission case 300 via the second brake B2 and is subjected to a stopping operation of the second brake B2.

According to the second exemplary embodiment of the present invention, the first and second planetary gear sets PG1 and PG2 are disposed in a sequence of the first planetary gear set PG1 and the second planetary gear set PG2.

The output gear 200 is disposed opposite the input shaft 100 with reference to the first planetary gear set PG1.

The first brake B1 and the second brake B2 are disposed near the output gear 200.

The first, second, and fourth clutches C1, C2, and C4 are disposed between the first planetary gear set PG1 and the second planetary gear set PG2, and the third clutch C3 is disposed opposite the first planetary gear set PG1 with reference to the second planetary gear set PG2.

An operation, shifting processes, and formation of each speed of the power train according to the second exemplary embodiment of the present invention are similar to those of the power train according to the first embodiment of the present invention, and will be understood by a person of ordinary skill in the art based on the teachings herein. Thus, a detailed explanation thereof will be omitted.

According to a third exemplary embodiment of the present invention, as shown in FIG. 3, the first clutch C1 variably connects the first ring gear R1 to the input shaft 100. The first sun gear S1 is fixedly connected to the Ravigneaux planet carrier PC2. The first planet carrier PC1 always acts as the input member by being fixedly connected to the input shaft 100. The Ravigneaux ring gear R2 always acts as the output member by being fixedly connected to the output gear 200. The first planet carrier PC1 is variably connected to the first ring gear R1 via the first clutch C1. The second Ravigneaux sun gear S3 is variably connected to the input shaft 100 via the second clutch C2. The first Ravigneaux sun gear S2 is variably connected to the input shaft 100 via the third clutch C3. The first ring gear R1 is variably connected to the Ravigneaux ring gear R2 via the fourth clutch C4. The Ravigneaux planet carrier PC2 is variably connected to the transmission case 300 via the first brake B1 and is subjected to a stopping operation of the first brake B1. The first Ravigneaux sun gear S2 is variably connected to the transmission case 300 via the second brake B2 and is subjected to the stopping operation of the second brake B2.

According to the third exemplary embodiment of the present invention, the first and second planetary gear sets PG1 and PG2 are disposed in a sequence of the first planetary gear set PG1 and the second planetary gear set PG2. The output gear 200 is disposed opposite the input shaft 100 with reference to the first planetary gear set PG1. The first brake B1 and the second brake B2 are disposed near the output gear 200. The first clutch C1 is disposed opposite the second planetary gear set PG2 with reference to the first planetary gear set PG1, the second and fourth clutches C2 and C4 are disposed between the first planetary gear set PG1 and the second planetary gear set PG2, and the third clutch C3 is disposed opposite the first planetary gear set PG1 with reference to the second planetary gear set PG2.

The second and third clutches C2 and C3 are disposed near the input shaft 100, and the first and fourth clutches C1 and C4 are disposed near the output gear 200.

An operation, shifting processes, and formation of each speed of the power train according to the third exemplary embodiment of the present invention are similar to those of the power train according to the first embodiment of the present invention, and will be understood by a person of ordinary skill in the art based on the teachings herein. Thus, a detailed explanation thereof will be omitted.

As shown in FIG. 6A to FIG. 6B and FIG. 7A to FIG. 7B, according to exemplary embodiments of the present invention, rotation speeds and reacting torque ratios of each frictional element are evenly distributed.

According to exemplary embodiments of the present invention, six forward speeds and one reverse speed are attained by using two planetary gear sets, four clutches, and two brakes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
a Ravigneaux planetary gear set having a Ravigneaux ring gear, a Ravigneaux planet carrier, and first and second Ravigneaux sun gears, wherein the Ravigneaux ring gear always acts as an output member;
a simple planetary gear set comprising an input member that is fixedly connected to an input shaft, a fixedly connected member that is fixedly connected to the Ravigneaux planet carrier, and a variably connected member that is variably connected to the Ravigneaux ring gear;
a first brake for variably stopping the Ravigneaux planet carrier;
a second brake for variably stopping the first Ravigneaux sun gear;
a first clutch for rotating the simple planetary gear set;
a second clutch for variably connecting the second Ravigneaux sun gear to the input shaft;
a third clutch for variably connecting the first Ravigneaux sun gear to the input shaft; and
a fourth clutch for variably connecting the variably connected member to the Ravigneaux ring gear.

2. The power train of claim 1, wherein the simple planetary gear set is a double pinion planetary gear set having a first sun gear, a first planet carrier, and a first ring gear,
wherein the first sun gear is the fixedly connected member, the first planet carrier is the input member, and the first ring gear is the variably connected member.

3. The power train of claim 2, wherein the first clutch variably connects the first sun gear to the input shaft.

4. The power train of claim 2, wherein the first clutch variably connects the first sun gear to the first ring gear.

5. The power train of claim 2, wherein the first clutch variably connects the first ring gear to the input shaft.

6. The power train of claim 2, wherein:
the first brake and the third clutch are operated in a first forward speed;
the second brake and the second clutch are operated in a second forward speed;
the first brake and the fourth clutch are operated in a third forward speed;
the second brake and the first clutch are operated in a fourth forward speed;
the first clutch and the fourth clutch are operated in a fifth forward speed;
the second brake and the fourth clutch are operated in a sixth forward speed; and
the first brake and the second clutch are operated in a first reverse speed.

7. A power train of an automatic transmission, comprising:
a first planetary gear set having a first sun gear, a first ring gear, and a first planet carrier;
a second planetary gear set having a Ravigneaux ring gear, a Ravigneaux planet carrier, and first and second Ravigneaux sun gears;
an input shaft;
an output gear; and
a transmission case,
wherein the first sun gear is fixedly connected to the Ravigneaux planet carrier,
the first planet carrier always acts as an input member by being fixedly connected to the input shaft,
the Ravigneaux ring gear always acts as an output member by being fixedly connected to the output gear,
the first sun gear is variably connected to the input shaft via a first clutch,
the second Ravigneaux sun gear is variably connected to the input shaft via a second clutch,
the first Ravigneaux sun gear is variably connected to the input shaft via a third clutch,
the Ravigneaux ring gear is variably connected to the first ring gear via a fourth clutch,
the Ravigneaux planet carrier is variably connected to the transmission case via a first brake and is subjected to a stopping operation of the first brake, and
the first Ravigneaux sun gear is variably connected to the transmission case via a second brake and is subjected to a stopping operation of the second brake.

8. The power train of claim 7, wherein the output gear is disposed opposite the input shaft with reference to the first planetary gear set.

9. The power train of claim 8, wherein the first and second brakes are disposed near the output gear.

10. The power train of claim 8, wherein the first clutch is disposed opposite the second planetary gear set with reference to the first planetary gear set, the second and fourth clutches are disposed between the first planetary gear set and the second planetary gear set, and the third clutch is disposed opposite the first planetary gear set with reference to the second planetary gear set.

11. The power train of claim 10, wherein the first, second, and third clutches are disposed near the input shaft, and the fourth clutch is disposed near the output gear.

12. The power train of claim 7, wherein:
the first brake and the third clutch are operated in a first forward speed;
the second brake and the second clutch are operated in a second forward speed;
the first brake and the fourth clutch are operated in a third forward speed;
the second brake and the first clutch are operated in a fourth forward speed;
the first clutch and the fourth clutch are operated in a fifth forward speed;
the second brake and the fourth clutch are operated in a sixth forward speed; and
the first brake and the second clutch are operated in a first reverse speed.

13. A power train of an automatic transmission, comprising:
a first planetary gear set having a first sun gear, a first ring gear, and a first planet carrier;
a second planetary gear set having a Ravigneaux ring gear, a Ravigneaux planet carrier, and first and second Ravigneaux sun gears;
an input shaft;
an output gear; and
a transmission case,
wherein the first sun gear is fixedly connected to the Ravigneaux planet carrier,
the first planet carrier always acts as an input member by being fixedly connected to the input shaft,
the Ravigneaux ring gear always acts as an output member by being fixedly connected to the output gear,
the first ring gear is variably connected to the Ravigneaux planet carrier via a first clutch,
the second Ravigneaux sun gear is variably connected to the input shaft via a second clutch,
the first Ravigneaux sun gear is variably connected to the input shaft via a third clutch,
the first ring gear is variably connected to the Ravigneaux ring gear via a fourth clutch,
the Ravigneaux planet carrier is variably connected to the transmission case via a first brake and is subjected to a stopping operation of the first brake, and
the first Ravigneaux sun gear is variably connected to the transmission case via a second brake and is subjected to a stopping operation of the second brake.

14. The power train of claim 13, wherein the output gear is disposed opposite the input shaft with reference to the first planetary gear set.

15. The power train of claim 14, wherein the first and second brakes are disposed near the output gear.

16. The power train of claim 14, wherein the first, second, and fourth clutches are disposed between the first planetary gear set and the second planetary gear set, and the third clutch is disposed opposite the first planetary gear set with reference to the second planetary gear set.

17. The power train of claim 13, wherein:
the first brake and the third clutch are operated in a first forward speed;
the second brake and the second clutch are operated in a second forward speed;
the first brake and the fourth clutch are operated in a third forward speed;
the second brake and the first clutch are operated in a fourth forward speed;
the first clutch and the fourth clutch are operated in a fifth forward speed;
the second brake and the fourth clutch are operated in a sixth forward speed; and
the first brake and the second clutch are operated in a first reverse speed.

18. A power train of an automatic transmission, comprising;
a first planetary gear set having a first sun gear, a first ring gear, and a first planet carrier;
a second planetary gear set having a Ravigneaux ring gear, a Ravigneaux planet carrier, and first and second Ravigneaux sun gears;
an input shaft;
an output gear; and
a transmission case,
wherein the first sun gear is fixedly connected to the Ravigneaux planet carrier,
the first planet carrier always acts as an input member by being fixedly connected to the input shaft,
the Ravigneaux ring gear always acts as an output member by being fixedly connected to the output gear,
the first planet carrier is variably connected to the first ring gear via a first clutch,
the second Ravigneaux sun gear is variably connected to the input shaft via a second clutch,
the first Ravigneaux sun gear is variably connected to the input shaft via a third clutch,
the first ring gear is variably connected to the Ravigneaux ring gear via a fourth clutch,
the Ravigneaux planet carrier is variably connected to the transmission case via a first brake and is subjected to a stopping operation of the first brake, and
the first Ravigneaux sun gear is variably connected to the transmission case via a second brake and is subjected to a stopping operation of the second brake.

19. The power train of claim 18, wherein the output gear is disposed opposite the input shaft with reference to the first planetary gear set.

20. The power train of claim 19, wherein the first and second brakes are disposed near the output gear.

21. The power train of claim 19, wherein the first clutch is disposed opposite the second planetary gear set with reference to the first planetary gear set, the second and fourth clutches are disposed between the first planetary gear set and the second planetary gear set, and the third clutch is disposed opposite the first planetary gear set with reference to the second planetary gear set.

22. The power train of claim 21, wherein the second and third clutches are disposed near the input shaft, and the first and fourth clutches are disposed near the output gear.

23. The power train of claim 18, wherein:
the first brake and the third clutch are operated in a first forward speed;
the second brake and the second clutch are operated in a second forward speed;
the first brake and the fourth clutch are operated in a third forward speed;
the second brake and the first clutch are operated in a fourth forward speed;

the first clutch and the fourth clutch are operated in a fifth forward speed;
the second brake and the fourth clutch are operated in a sixth forward speed; and
the first brake and the second clutch are operated in a first reverse speed.

* * * * *